United States Patent
Kuo et al.

(10) Patent No.: US 8,832,807 B1
(45) Date of Patent: Sep. 9, 2014

(54) METHOD AND APPARATUS FOR ASYNCHRONOUS DYNAMIC PASSWORD

(76) Inventors: Christine E. Kuo, Piedmont, CA (US);
David E. Kuo, Piedmont, CA (US);
Hui-Hsin Wu, Piedmont, CA (US);
James S. Kuo, Piedmont, CA (US)

( * ) Notice: Subject to any disclaimer, the term of this patent is extended or adjusted under 35 U.S.C. 154(b) by 80 days.

(21) Appl. No.: 13/196,105

(22) Filed: Aug. 2, 2011

Related U.S. Application Data

(60) Provisional application No. 61/370,900, filed on Aug. 5, 2010.

(51) Int. Cl.
*G06F 21/45* (2013.01)
*H04L 9/08* (2006.01)
*H04L 9/06* (2006.01)
*G06F 21/41* (2013.01)
*G06F 21/44* (2013.01)

(52) U.S. Cl.
CPC ............ *H04L 9/0656* (2013.01); *H04L 9/0863* (2013.01); *H04L 9/0662* (2013.01); *G06F 21/41* (2013.01); *G06F 21/44* (2013.01); *H04L 9/0819* (2013.01); *G06F 21/45* (2013.01)
USPC ................. 726/6; 726/2; 726/4; 726/5; 726/8; 713/183; 713/184

(58) Field of Classification Search
CPC ... H04L 9/0656; H04L 9/0819; H04L 9/0864; H04L 9/0662; G06F 21/41; G06F 21/44; G06F 21/45
USPC ........................... 726/2, 4–6, 8; 713/183–184
See application file for complete search history.

(56) References Cited

U.S. PATENT DOCUMENTS

| | | | | |
|---|---|---|---|---|
| 823,492 | A * | 6/1906 | Dunham | 209/219 |
| 4,885,778 | A | 12/1989 | Weiss | |
| 5,768,373 | A * | 6/1998 | Lohstroh et al. | 380/286 |
| 7,210,166 | B2 * | 4/2007 | Davis et al. | 726/6 |
| 7,363,494 | B2 | 4/2008 | Brainard et al. | |
| 7,546,456 | B2 * | 6/2009 | Le et al. | 713/162 |
| 7,552,467 | B2 * | 6/2009 | Lindsay | 726/5 |
| 7,571,489 | B2 * | 8/2009 | Ong et al. | 726/29 |
| 7,584,357 | B2 * | 9/2009 | Park | 713/169 |
| 7,757,275 | B2 * | 7/2010 | Crall et al. | 726/5 |
| 7,840,993 | B2 * | 11/2010 | Ganesan et al. | 726/7 |
| 7,930,554 | B2 * | 4/2011 | Coulier et al. | 713/184 |
| 7,984,491 | B2 * | 7/2011 | Ueda et al. | 726/6 |
| 8,087,074 | B2 * | 12/2011 | Popp et al. | 726/9 |
| 8,108,309 | B2 * | 1/2012 | Tan | 705/50 |

(Continued)

OTHER PUBLICATIONS

Vaidya et al., "Using One-Time Password Based Authentication for Wireless IP network", ISI 2006, LNCS 3975, pp. 739-740.*

(Continued)

*Primary Examiner* — Kambiz Zand
*Assistant Examiner* — Tongoc Tran

(57) ABSTRACT

Apparatus and method for computer-based or mobile-device-based electronic generation and verification of dynamic password, or one-time-password (OTP), that does not require initial synchronization, nor re-synchronization, between a client OTP generator and the corresponding OTP server, is provided. It employs the general OTP principles and methods to ensure the single-use of the password credential and the security strength of the OTP, and it utilizes instant dynamic parameter(s) communications for equivalent instant synchronization (EQ-sync). It can also be used to ensure integrity and authenticity of an online transaction request.

19 Claims, 4 Drawing Sheets

(56) References Cited

U.S. PATENT DOCUMENTS

| | | | | |
|---|---|---|---|---|
| 8,184,872 | B2* | 5/2012 | Lu et al. | 382/124 |
| 8,213,906 | B2* | 7/2012 | Chen | 455/411 |
| 8,220,039 | B2* | 7/2012 | Gonzalez et al. | 726/9 |
| 8,225,391 | B2* | 7/2012 | Labaton | 726/19 |
| 8,230,231 | B2* | 7/2012 | Freeman et al. | 713/184 |
| 8,234,696 | B2* | 7/2012 | O'Malley et al. | 726/6 |
| 8,255,696 | B2* | 8/2012 | Florencio et al. | 713/184 |
| 8,261,087 | B2* | 9/2012 | Fort et al. | 713/184 |
| 8,266,441 | B2* | 9/2012 | Inskeep et al. | 713/185 |
| 8,266,711 | B2* | 9/2012 | Holtzman et al. | 726/27 |
| 8,281,375 | B2* | 10/2012 | von Krogh | 726/6 |
| 8,321,929 | B2* | 11/2012 | Jaber et al. | 726/16 |
| 8,467,770 | B1* | 6/2013 | Ben Ayed | 455/411 |
| 8,468,361 | B2* | 6/2013 | Buer et al. | 713/182 |
| 2010/0131764 | A1* | 5/2010 | Goh | 713/171 |

OTHER PUBLICATIONS

Wikipedia, "One-Time Password", Jun. 1, 2013, 7 pages, Wikimedia Foundation Inc., San Francisco, CA, USA.
Wikipedia, HOTP "HMAC-based One-Time-Password Algorithm", Jun. 1, 2013, 4 pages, Wikimedia Foundation, Inc. San Francisco, CA, USA.
Wikipedia, "SecurID", Jun. 1, 2013, 6 pages, Wikimedia Foounda-tion, Inc. San Francisco, CA, USA.
Wikipedia, "Man-in-the-middle,attack", Jun. 1, 2013, 6 pages, Wikimedia Foundation, Inc. San Francisco, CA, USA.
Wikipedia, "Man-in-the-browser", Jun. 1, 2013, 8 pages, Wikimedia Foundation, Inc. San Francisco, CA, USA.
Wikipedia, "CAPTCHA"; Jun. 1, 2013, 9 pages; Wikimedia Foun-dation, Inc. San Francisco, CA, USA.
Fraud.org, "Internet Fraud", Jun. 1, 2013, 4 pages, National Consum-ers League, Washington, D.C., USA.

\* cited by examiner

METHOD AND APPARATUS FOR ASYNCHRONOUS DYNAMIC PASSWORD

CROSS-REFERENCE TO RELATED APPLICATIONS

This application claims benefits of the U.S. provisional patent application No. 61/370,900, filed Aug. 5, 2010, which is herein incorporated by reference.

GOVERNMENT SPONSORSHIP

Not applicable.

MICROFICHE APPENDIX

Not applicable.

BACKGROUND

1. Field of Invention

This invention relates to an apparatus and method for electronic generation and verification of dynamic code, or dynamic password, or also known as one-time-password (OTP) [1], that minimizes the costs related to deployment and client-server synchronization, and protect online authentication credentials or online transactions over the wired or wireless networks, such as internet.

2. Description of Prior Art

With the increased usage of internet, new websites are coming online constantly. Increased access to the websites inevitably accompanied with increased opening of number of online accounts. For those websites that only allow selected and privileged access, such as websites related to banking, financial services, ecommerce, subscriptions, etc., protection of these privileged online accounts access has often been through account userID (or, username) and password that the selected privileged account users have set-up when opening the account. Account access using login credentials, such as userID and password, are still the norm today, even though it's widely acknowledged that the static userID and password are not secure enough in today's elevated threat environment, wired or wireless. The static passwords are subject to phishing and replay attack. The concerns over the security and authentication for account identity and access management have pushed the advancement in deployment of one-time-password (OTP).

OTP, namely one-time-password [1], or, one-time-pad, can only be used once, renders stealing of the one-time-password (OTP) meaningless. Since an OTP cannot be replayed, once it is created and used, it is expired. Phishing on OTP becomes useless. OTP generation usually involves feeding of a device static secret, which is shared between the client and the corresponding server, dynamic variable(s), and may be other additional parameter(s), into a predefined cryptographic one-way secure hashing algorithm, such as MD5 or SHA-1 or others, to produce an OTP. Which is then used as the (dynamic) password in a secured account login process. The device static secret is pre-installed securely on the client OTP generator and on the server. And the dynamic variable(s), and parameter(s) such as salt(s), can also be pre-installed or calculated on the fly.

OTP has been used for identity and access to high worth network accounts, including high worth bank accounts, financial service accounts, ecommerce accounts, high security corporate accounts, etc. It's not a common form of account access, due to the high cost of its deployment. To start with, synchronization between the client OTP generator and the corresponding server OTP generator, usually through time-based synchronization or counter-based (or, event-based) synchronization, are often required to make the OTP system work. When client and server generators are out-of-sync, which often happen for various reasons, re-synchronization is necessary, and the re-synchronization will incur substantial additional support and maintenance costs.

SecurID by RSA [5] is a patented [2],[3] time-based OTP system, it is one of the early OTP system in general deployment, with its client OTP generator tokens reaching millions of users. Its client-server synchronization is based on the time-clock that is on the client token and on the server. Sync-initialization and re-sync can be carried out in many ways, such as implementing a time-compensation, or time-shift dynamic variable to accommodate the time-clock drifting out-of-sync problem. When the out-of-sync problem cannot be resolved by the time-shift dynamic variable fix automatically, the client generator usually needs to be recalled for repair.

HOTP, HMAC-based one-time-password (HOTP) [4], is a public supported counter-based OTP system. It requires a static secret (the secret key), and a dynamic variable (the counter). It, too, requires initial synchronization and any necessary follow-on re-sync on the counter when it becomes out-of-sync with the server. Continuing synchronization can also be carried out, such as implementing a counter-shift allowance dynamic variable to accommodate the counter out-of-sync problem. When the out-of-sync problem cannot be resolved by the counter-shift allowance fix automatically, the client generator usually needs to be recalled for repair.

There are many more OTP system vendors, such as Aladdin [8], Gemalto [9], etc. But, all the OTP systems offered up-to-date requires the initial synchronization and re-sync when out-of-sync, between the client generator and the server, so that the OTP system can continue to work properly.

To facilitate an OTP system that can be available to the mass general public for any network account access, wired or wireless, it must minimize both the deployment costs, support costs and maintenance costs. An area to minimize the OTP system costs is, obviously, to reduce or eliminate the synchronization costs. At the same time, it must also be able to live up to the security requirement that the account access demands, such as for privileged account. The minimum-cost-OTP system must produce one-time-use password with security strength that prevents replay attack, at least more secure than simply username and password protection, it also should be easy to use and easy and inexpensive to deploy.

SUMMARY OF THE INVENTION

Embodiments of the invention provide computer-implemented or mobile-device-implemented apparatus and method for electronic generation and verification of one-time-password (OTP) that does not require initial synchronization, nor re-synchronization, between a client OTP generator and the corresponding OTP server. It employs the general OTP principles and methods to ensure the single-use of the password credential and the security strength of the OTP, and it utilizes instant dynamic parameter(s) communications for equivalent instant synchronization (EQ-sync).

In one embodiment of the invention, an OTP generator can be such as:

$$OTP = h(\text{salt}, G\text{-code}, \text{PIN}, \text{static-secret(s)}); \quad \text{Equation 1:}$$

Where,
  h=hashing function that based on the cryptographic one-way secure hashing algorithm, such as MD5, SHA-1, HMAC-SHA-1, etc.;
  The hashing can be repeated a number of times;
  salt=algorithm salt(s), such as,
    mod(h((G-code*G-code)>>2)<<4), 1,000,000, etc.;
    different salt can be used for different account, and/or for different OTP generation;
  G-code=a dynamic variable, instantly communicated generation-code; Can also have many G-code(s);
  PIN=the personal-identification-number (PIN), or, password, the secret that the user set up when opening the account;
  static-secret(s)=device static-secret key(s) unique to the client generator, or user account(s); they are shared between the client device and corresponding server(s);

The hashing function h can take as input, the salt, G-code, PIN, and the static-secret(s) to generate a dynamic authentication code, i.e. a one-time-password (OTP), which is submitted by the user, together with the user's identity userID/username, to the server for authentication.

The security strength of the OTP largely depends on the algorithm, static-secret(s) and the salt, to protect the PIN/password. It assumes that it's generally infeasible to find the inverse function of the cryptographic one-way secure hashing algorithm used [4], and that the salt algorithm used can not be easily found, and that the static-secret(s) are securely stored, such as protected by a PIN.

In one embodiment of the invention, the client OTP generation software package can be distributed via DVD, CD, USB device, etc. or downloadable through wired or wireless internet, or other network, or through other means. In one aspect of the embodiment, a user can download an OTP generator application, or app, (FIG. 3) with the client OTP generation software over the air and install it on his or her mobile device. A related static-secret can also be installed and shared between the client generator and the corresponding server generator. In another embodiment, one installed static-secret corresponds only to one specific user's account. The widget (FIG. 3) is a user interface for the user to interact with the client OTP generator. In one embodiment, the user can feed G-code and PIN to the client OTP generator by entering them to the widget data fields, and the widget will display the resulting OTP generated by the client generator (FIG. 3).

In one embodiment of the invention, a website, having installed and configured the server OTP generator in its server(s), can authenticate its account holder users based on the username and OTP that each user submit. A user registers and opens an account at the website, and set up the PIN/password and userID/username. Then, when the user desires to access to his/her account at the website by visiting the account login URL of the website, the website server will generate a G-code and post to the user's browser a login web-page with the G-code (FIG. 2) for the user to fill out and engaging in a web session. The user, having installed the client OTP generator on his/her mobile device, can feed the G-code and his/her PIN/password to the client OTP generator on his/her mobile device to obtain the first OTP (FIG. 3), and then enter username and the first OTP into the corresponding data fields in the login web-page (FIG. 2). After the website server receives the login request, the server will retrieve the G-code that was generated for the web session and the PIN that was registered with the username, and generate a corresponding second OTP, and match the second OTP to the first OTP. If the second OTP matches the first OTP, the user is authenticated, and account access is granted. If there is no match between the first OTP and the second OTP, user authentication fails, and the account access is denied.

In another embodiment of the invention, to facilitate secure authentication and transactions using the OTP token, additional data fields can be included so as to ensure the integrity of the data of each transaction (FIG. 4).

In one embodiment of the invention, the data fields that the user are to fill out (FIGS. 2,3,4), can be by way of prompting the user on an overlaying screen, so as for the user to enter the data on the overlaying prompting screen, the data such as G-code or PIN or others, one at a time.

The client OTP generator software and the server OTP generator software are very much alike, taking same input parameters for generating the same one-time-password (OTP). The input parameters that the OTP generators take, in addition to the G-code and PIN/password mentioned above, they can also include salt and static-secret(s). A static-secret is shared between the client generator and the server generator, and is securely stored in the server, as well as securely stored on the user's OTP generator device, such as a mobile device. The salt can be securely stored or computed on the fly. The algorithm used to compute the salt should be the same for both the client OTP generator and the server OTP generator, in order to result in the same OTP code, which is required for passing a successful account access authentication.

In another embodiment of the invention, the user can also authenticate the server in a similar way, if the server would provide a form to facilitate such server authentication. The user can initiate server authentication by generating and sending a G-code to the server, and the server would generate the corresponding OTP, with OTP parameter(s) from the stored secrets, such as those pre-installed shared device static-secret(s), salt, and/or those secret(s), such as user password/PIN, that the user set up when registering the account. The user can authenticate the server by matching up the server generated OTP to the OTP generated by his/her client OTP generator. If there is a match, the server is authenticated, else, the server authentication fails.

OBJECTS AND ADVANTAGES

The objects and advantages that this invention achieved are as follows:
(1) A minimum cost one-time-password (OTP) system available to facilitate mass general public deployment
(2) A one-time-password (OTP) system that does not require initial synchronization between the client and corresponding server
(3) A one-time-password (OTP) system that is always synchronized between the client and corresponding server
(4) A one-time-password (OTP) system that does not require re-sync between the client and corresponding server

DESCRIPTION OF DRAWINGS

So that the manner in which the above recited features and benefits of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION AND OPERATION OF INVENTION

Main Embodiment

In accordance with the current invention, embodiments of the invention provide computer-implemented or mobile-device-implemented apparatus and method for electronic generation and verification of dynamic password, i.e. the one-time-password (OTP, or, one-time-pad) that does not require initial synchronization, nor re-synchronization, between a client OTP generator and the corresponding OTP server generator. It employs the general OTP principles and methods, to ensure the single-use of the dynamically generated OTP password credential and the security strength of the OTP, and it utilizes instant dynamic parameter(s) communications for equivalent instant synchronization (EQ-sync). The OTP generator, or the dynamic password generator, is a computer, a computer server, a computer server cluster, a computing device, a mobile device, or other online or offline computing device that equipped with dynamic password, or OTP, generation software or hardware which is capable of generating a dynamic password, or an OTP, based on a given set of input parameters.

Figure 1:
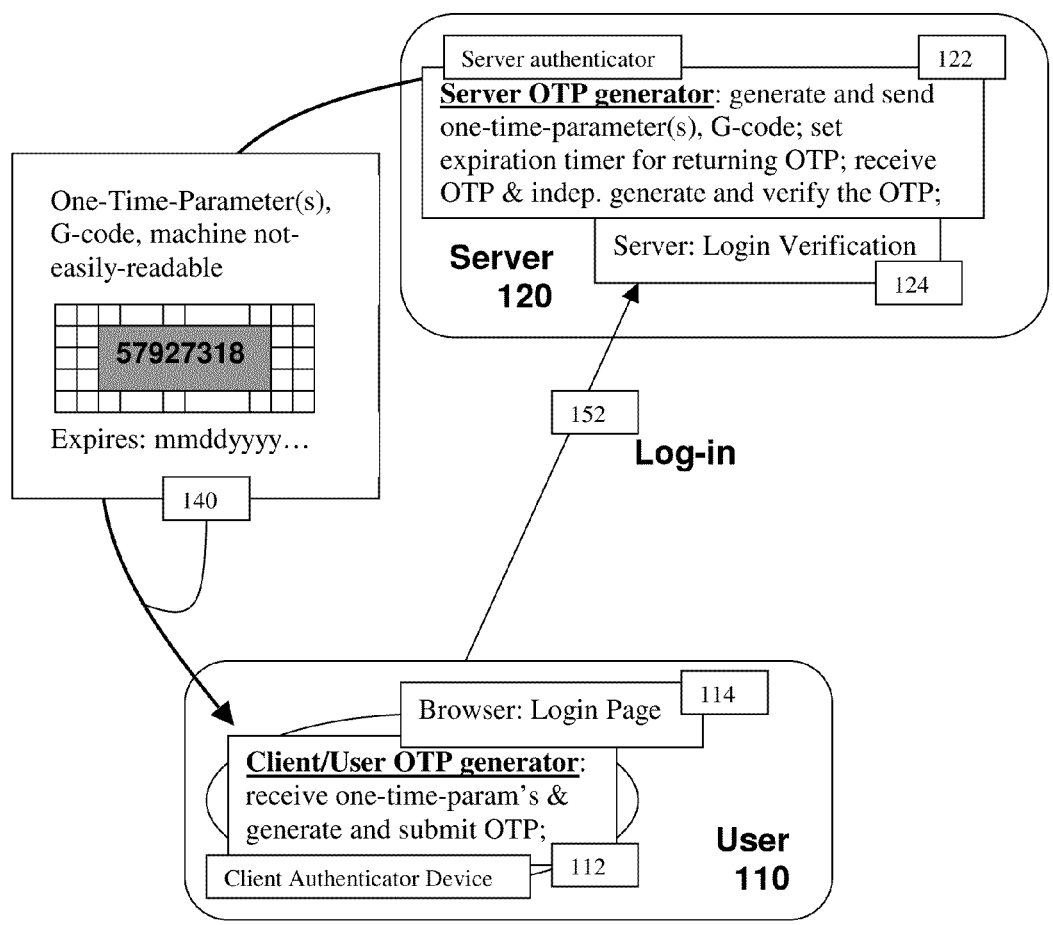
FIG. 1 illustrates a flow diagram of an exemplary one-time-password (OTP) system according to one embodiment of the invention.

FIG. 1 illustrates one embodiment of the current invention. A user 110 wishes to gain privileges of access to an account of the website server 120. The user 110 refers to a person or an entity that utilizes computers, computing devices, or mobile devices 110 to connect and communicate 140, 152 over wired or wireless networks, such as internet. The user 110 communicates 152, 140 over the internet through the browser 114 on the computers, computing devices or mobile devices 110. The server 120 refers to computer servers, computing machinery or devices 120 of a website that are connected to the wired or wireless networks, such as internet, and communicate 140, 152 over such networks, directly or indirectly. The server 120 must authenticate the user 110, to determine if the user 110 is truly the account holder and can be allowed privileges of access to the account and the services that the server 120 provides for the account.

In one embodiment of the invention, an OTP generator 112, 122 is a software that implements the following algorithm, and the software can be installed and executes on a computer, a computing device or a mobile device 112, 122:

OTP=$h$(salt, $G$-code, PIN, static-secret(s));　　　Equation 1:

Where,
　　h=hash function that based on the cryptographic one-way secure hashing algorithm, such as MD5, SHA-1, HMAC-SHA-1, etc.;
　　The hashing can be repeated a number of times;
　　salt=algorithm salt(s), such as,
　　　　mod(h(($G$-code*$G$-code)>>2)<<4), 1,000,000), etc.;
　　　　different salt can be used for different account, and/or for different OTP generation;
　　$G$-code=a dynamic variable, a dynamic generation code, instantly communicated generation-code; can have many $G$-code(s);
　　PIN=the personal-identification-number (PIN), or, password, the secret that the user set up when opening the account;
　　static-secret(s)=device static-secret key(s) unique to the client generator, or user account(s); they are shared between the client device and corresponding server(s);

The hashing function h can take as input parameters, the salt, $G$-code, PIN, and the static-secret(s) to generate a dynamic authentication code, i.e. a one-time-password (OTP), which can be submitted by the user 110, together with the user's identity userID/username, to the server 120 for authentication. The hashing function can be carried out repeatedly or iteratively many times. And the $G$-code does not need to be limited to be one $G$-code, there can also be many $G$-codes. There can also be many salts, pre-computed and stored, or computed on the fly.

The security strength of the generated OTP largely depends on the algorithm, static-secret(s) and the salt(s), to protect the PIN/password. It's assumed that it's generally infeasible to find the inverse function of the cryptographic one-way secure hashing algorithm used [4], and that the salt algorithm used can not be easily discovered, and that the static-secret(s) are securely stored, such as protected by a PIN.

Figure 3:
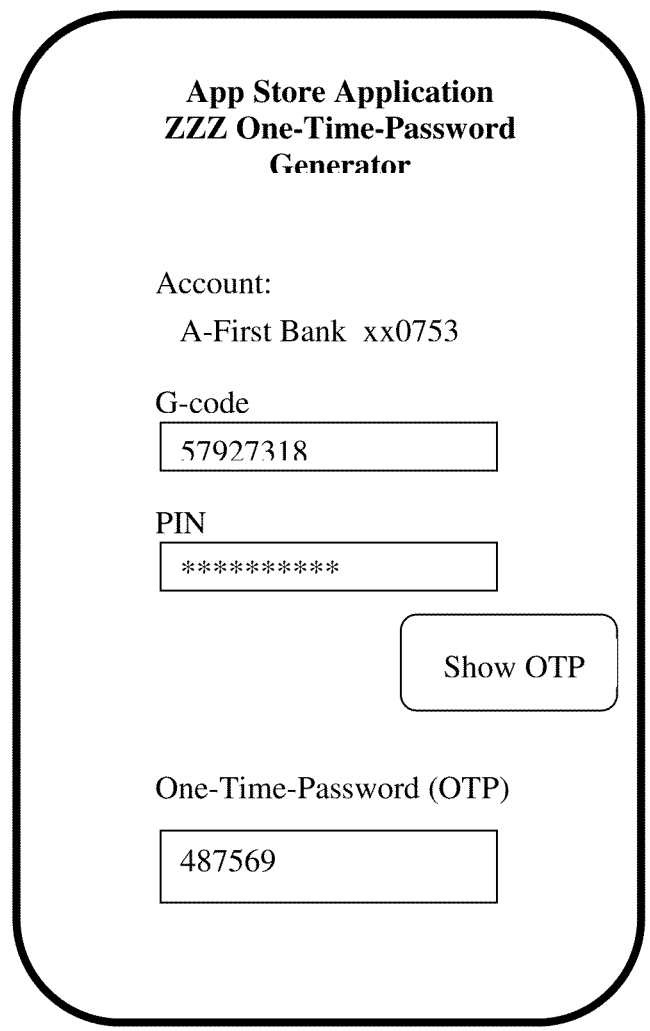
FIG. 3 illustrates an interactive exemplary widget user interface for an OTP generator on a mobile device according to one embodiment of the invention.

In one embodiment of the invention, the client OTP generation software package can be distributed via DVD, CD, USB device, etc. or downloadable through wired or wireless internet, or other network, or through other means. In one aspect of the embodiment, a user 110 can download an OTP generator application, or app, (FIG. 3) with the client OTP generation software over the air and install it on his or her mobile device 112. A related static-secret can also be installed and shared between the client generator 112 and the corresponding server generator 122. In another embodiment, one installed static-secret corresponds only to one specific user's account. The widget (FIG. 3) is a user interface for the user 110 to interact with the client OTP generator 112. In one embodiment, the user 110 can feed $G$-code and PIN to the client OTP generator 112 by entering them to the widget data fields, and the widget will display the resulting OTP generated by the client generator 112 (FIG. 3).

A web server 124 is an internet facing server of a website 120. A website can have servers 122 that run server OTP generator software only, servers interfacing the internet, and other functional servers. We will refer to the website 120, web server 124 or website server 120 interchangeably throughout this document.

Figure 2:
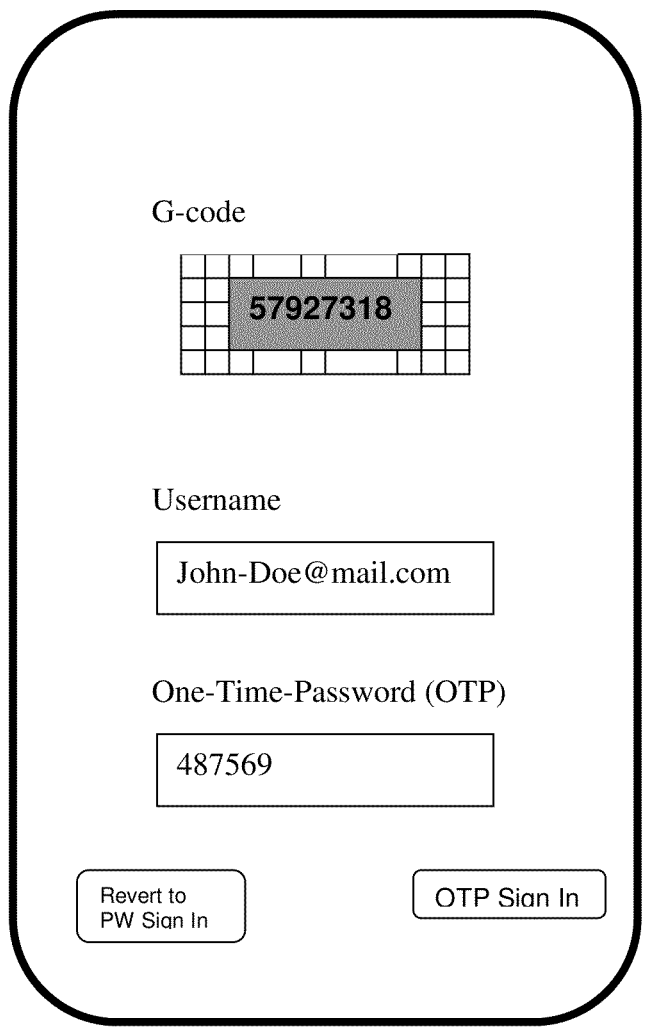
FIG. 2 illustrates an interactive exemplary prompts for an OTP login on a mobile device according to one embodiment of the invention.

In one embodiment of the invention, a website 120, having installed and configured the server OTP generator in its server(s) 122, can authenticate its account holder users 110 based on the username and OTP that each user 110 submit 152. A user 110 registers and opens an account at the website 120, and set up the PIN/password and userID/username. Then, when the user 110 desires to access to his/her account at the website 120 by visiting 152 the account login URL of the website 120, the website server 120 will generate a $G$-code and post 140 to the user's browser 114 a login web-page with the $G$-code (FIG. 2) for the user 110 to fill out and engage in a web session 140, 152. The user 110, having installed the client OTP generator on his/her mobile device 112, can feed the $G$-code and his/her PIN/password to the client OTP generator on his/her mobile device 112 to obtain the first OTP (FIG. 3), and then enter username and the first OTP into the corresponding data fields in the login web-page (FIG. 2). After the web server 124 receives the login request 152, the server 120 will retrieve the G-code that was generated for the web session and the PIN that was registered with the username, and feed the PIN and G-code to the server OTP generator 122 which will generate a corresponding second OTP, and match the second OTP to the first OTP. If the second OTP matches the first OTP, the user 110 is authenticated, and account access is granted. If there is no match between the first OTP and the second OTP, user authentication fails, and the account access is denied.

Figure 4:
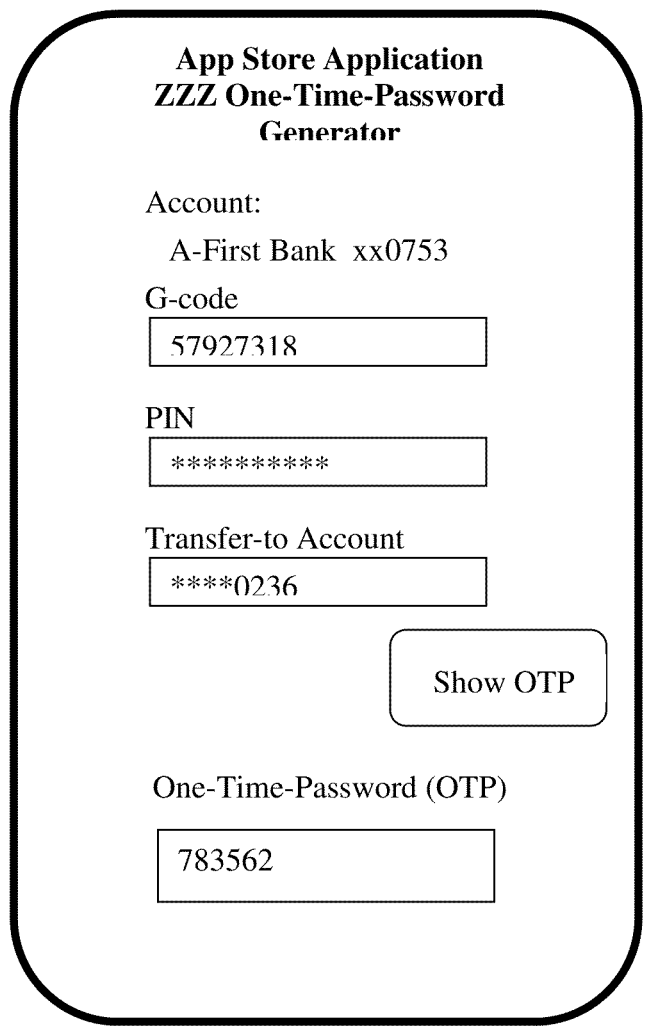
FIG. 4 illustrates an interactive exemplary prompts for a transaction on a mobile device according to one embodiment of the invention.

In another embodiment of the invention, to facilitate secure authentication and transactions using the OTP token, additional data fields can be included so as to ensure the integrity of the data of each transaction (FIG. 4) and the authenticity of the transaction request throughout. The additional data items can be account numbers and dollar amount(s) for money transfers between accounts; or, the data items can be sender's account, receiver's account and proprietary/privileged data or document(s) or document(s) link(s) for sharing the proprietary/privileged data or document(s) among accounts; or, any data items or document(s) or document(s) link(s) for any other secure transaction requests.

In one embodiment of the invention, the data fields that the user are to fill out (FIGS. 2,3,4), can be by way of prompting the user on an overlaying screen, so as for the user to enter the data on the overlaying prompting screen, the data such as G-code or PIN or others, one at a time. The user interface for the user to feed the data, to interact with the OTP generator can have many different designs.

The communications 140, 152 can be over the networks that are public or private, wired, wireless or over the air.

The client OTP generator 112 software and the server OTP generator 122 software are very much alike, taking same input parameters for generating the same one-time-password (OTP). The input parameters that the OTP generators 112, 122 take, in addition to the G-code and PIN/password mentioned above, they can also include salt(s) and static-secret(s). A static-secret is shared between the client generator 112 and the server generator 122, and is securely stored in the server 120, as well as securely stored on the user's OTP generator device 112, such as a mobile device 112. The salt can be computed on the fly. The algorithm used to generate the salt should be the same for both the client OTP generator 112 and the server OTP generator 122, in order to result in the same OTP code, which is required for passing a successful authentication.

In another embodiment of the invention, FIG. 1 also illustrates communications over a virtual-private-network (VPN), where the server 120 is a VPN server 120, and communications 140, 152 are VPN channels. During a user 110 VPN login attempt, the VPN server 120 can generate a G-code and send 140 the G-code together with a login prompt 114 (FIG. 2) to the user 110, engaging the user 110 in a VPN session. The user 110 can enter the G-code and his/her PIN/password into his/her client OTP generator 112 on his/her client OTP generator device, and obtain a first OTP generated on his/her client OTP generator device 112, such as a mobile device 112 (FIG. 3). Then, the user 110 can fill out the login prompt 114 with username and the first OTP (FIG. 2), and submit 152 the login prompt form (FIG. 2) to the VPN server 120 for authentication. The VPN server 120 can then retrieve the G-code, which was generated for the corresponding VPN session, and the PIN/password that is associated with the username, and feed the G-code and the PIN into the server OTP generator 122 to produce a second OTP. The server will then match the second OTP to the first OTP. If there is a match, the VPN login access is granted; if there is no match between the first OTP and the second OTP, the VPN login access is denied.

In one embodiment of the invention, a G-code generated can be a code of any size with at least one letter, or can be a random number of any size with at least one digit, for example, the size of 6 digits, 8 digits, 10 digits, etc. instantly generated by the server 120 and communicates 140 to the user 110, together with a login authentication form, when the user 110 attempt to gain access to the server 120. The G-code can be communicated 140 to the user 110 via CAPTCHA technology [10], so that the G-code is not easily machine-readable, preventing man-in-the-middle sniffing attack. The G-code is dynamically generated and preferably a unique random number. The G-code can have an expiration time set by the server 120, such that the user 110 will need to generate and submit 152 the corresponding client OTP before the G-code expires. For example, the G-code can expire 5 minutes from the time the user requested an OTP login authentication, or expire 3 minutes from the time the user requested an account money transfer. The G-code is a dynamic variable, instantly generated by the server 120 and communicated 140 to the user 110, it bridges up and instantly synchronize the OTP generation between the server generator 122 and the client generator 112. The exposure of G-code will not unduly compromise the security strength of the OTP generated by the current invention. A G-code is a finite number, the same G-code may appear more than once over time.

In another embodiment of the invention, the salts used for generating OTP to protect PIN/password are computed on-the-fly using algorithms known to both client OTP generator 112 and server OTP generator 122. There can be many salt algorithms available to, or even installed in, the client generator 112 and server generator 122. For the user 110 to be authenticated by the server 120, during each authentication request event, the user's client OTP generator 112 must use the same salt algorithm as that used by the server OTP generator 122, during a login authentication session. The salt algorithms can base on some seed values that are available to the client generator 112 as well as the server generator 122, and the salt computation will then be algorithmic manipulations on the seed values. The seed values can be G-code, PIN, static-secret(s), etc. or any combinations thereof.

In one embodiment of the invention, the static-secret or static-secrets are shared between the server 120 and the user 110, and can be installed together with the OTP generator 112, 122, when installing the generator software. The static-secret(s) can also be installed separately after installing the generator software. The static-secret(s) must be securely stored against theft or misappropriation, but available for access on the client generator device by the client OTP generator 112, and accessible by the server OTP generator 122 on the server 120.

In one aspect of the embodiment, one or more static-secret(s) or static-secret key(s) can uniquely associate to a user account, which may result in many static-secrets to be associated with a client OTP generator 112, where the user utilizes a single client OTP generator 112 for login authentication to many servers accounts. Which means it may require installation of those many static-secrets on the user's client OTP generator device 112, and installing also many static-secrets on each corresponding server 120 as well, one or more static-secret(s) for each account. In another aspect of the embodiment, one or more static-secret key(s) can uniquely link to a client OTP generator 112, which may require installing the same one or more static-secret(s) on the client OTP generator 112, as well as installing the same one or more static-secret(s) to all the account servers 120 where the user may own an account. A static-secret can be a random number in hexadecimal or decimal form or other form, and can be encrypted when stored.

In one embodiment of the invention, when the client OTP generator 112 serves more than one account, the widget (FIG. 3) of the client OTP generator 112 can prompt the user 110 to select the account which the user 110 desires to gain access to. Once the user 110 made the selection, the client OTP generator 112 will retrieve the corresponding static-secret(s) and/or salt(s) for the selected account, and generates corresponding OTP for the user 110 to gain access to the account.

In one embodiment of the current invention, the client OTP generator 112 can generate an OTP simply base on the user's 110 input of parameters (G-code, and PIN). The client OTP generator 112 can also generate an OTP based on various set of input parameters such as (G-code, PIN and salt), (G-code, PIN and static-secret), or (G-code, PIN, static-secret and salt). Salt can be accessed or computed on the fly and static-secret is accessible to the client OTP generator 112. Different set of input parameters will likely result in different OTP generated. For the user to be authenticated to the server using the OTP, client generator 112 and the server generator 122 must generate the same OTP in the same way, using the same algorithm and the same parameters set.

In another embodiment of the current invention, the server OTP generator 122 can generate an OTP by retrieving the parameters (G-code, and PIN), where G-code was generated by the server 120 for the session in which the user 110 is seeking for login authentication to gain access to the server, and the PIN is associated with the user's 110 account. The server OTP generator 122 can also generate an OTP based on various set of parameters such as (G-code, PIN and salt), (G-code, PIN and static-secret), or (G-code, PIN, static-secret and salt). Where salt can be accessed or computed on-the-fly and static-secret is accessible to the server OTP generator 122. Different set of OTP generation parameters will likely result in different OTP generated. For the server 120 to authenticate the user 110, client generator 112 and the server generator 122 must generate the same OTP in the same way, using the same algorithm and the same parameters set.

In one embodiment of the invention, generating a dynamic password OTP based on a given set of input parameters further comprising algorithmically combining the input parameters, such as combining the G-code, the PIN or password, the stored static-secret or stored static-secrets, and the salt or salts. The algorithmic combination includes, but not limited to, arithmetic manipulations, and cryptographic one-way hashing on any combination of the input parameters.

For user 110 readability and ease of use, the OTP generated can be truncated to 6 digits, or 8 digits, or 10 digits, etc. using modulo arithmetic [4].

In one embodiment of the invention, the user 110 can also authenticate the server 120 in a similar way, if the server 120 would provide a way to facilitate such server authentication. The user 110 can choose to authenticate the server by generating and sending a G-code to the server 120, and the server 120 would generate the corresponding OTP, with OTP generation parameter(s) from the stored secrets, such as those pre-installed shared device static-secret(s), salt(s), and/or those secret(s), such as user 110 password/PIN, that the user 110 set up when registering the account. The user 110 can authenticate the server 120 by matching up the server 122 generated OTP to the OTP generated by his/her client OTP generator 112. If there is a match, the server is authenticated, else, the server authentication fails.

In another embodiment of the invention, any two parties can authenticate each other peer-to-peer. Any one of the parties can be a user 110 or a server 120 or other entities. One party, the sending party, can choose to authenticate another party, the receiving party, by generating and sending a G-code or code(s) to the receiving party, and the receiving party would generate a first OTP, with OTP generation parameter(s) from the stored secrets, such as those pre-installed shared device static-secret(s), salt(s), and/or those secret(s), such as password/PIN, and sends the first OTP generated to the sending party. The sending party can generate a second OTP to authenticate the receiving party by matching up the second OTP to the first OTP received. If there is a match, the receiving party is authenticated, else, the authentication fails.

In one embodiment of the invention, generation of G-code or code(s), can be carried out at an independent server, and deliver to the user 110 or user(s) and to the server 120 or server(s); or, deliver to the sending party or parties and to the receiving party or parties. Once receiving the G-code or code(s), the OTP can be generated and verified.

It's clear that through-out the current invention, there is no worry about synchronization problem or issues, nor is there any implication that the client generator 112 and the server generator 122 will be out-of-sync. Thus, no synchronization cost will be required to deploy an OTP system that is based on the current invention.

CONCLUSION, RAMIFICATIONS AND SCOPE OF INVENTION

Accordingly, one benefit of the method and apparatus of asynchronous dynamic password system as described herein is that a one-time-password generation and verification system can be designed such that the synchronization between the client generator and the server generator are instantly established when they need to, or, in one aspect, the synchronization is always sustained, never break or out-of-sync. Thus, the hefty costs associated with client-server synchronization and its related maintenance and support can be saved.

Another benefit of using the dynamic one-time-password generation process as described herein is that, since the synchronization bridges can be instantly built, a client generator does not need to be restricted to the strict association with one server generator only. That is, the client generator and server generator association relationship does not need to be one-to-one anymore, it can be many-to-many, the generation parameters DB need not to be concentrated in one server location.

Additional benefit of using the dynamic password generation process as described herein is that migration from the existing username and password based authentication system will be an easy path. It applies well to web-based, network-based, or VPN-based systems.

In addition, using the one-time-password generation process as described herein allows flexible installation of the OTP security strength, via various schemes of installing the generation parameters.

While my above description contains many specificities, these should not be construed as limitations on the scope of this invention, but rather as an exemplification of one preferred embodiment thereof. Many other variations are possible.

Although several preferred embodiments which incorporate the teachings of the present invention have been shown and described in detail, those skilled in the art can readily devise many other varied embodiments that still incorporate these teachings. In addition, while the foregoing is directed to embodiments of the present invention, other and further embodiments of the invention may be devised without departing from the basic scope thereof, and the scope thereof is determined by the claims that follow.

We claim:

1. A computer implemented method for generation and verification of a dynamic password, also known as one-time-password, providing at least one server, comprising:
   Generating a dynamic generation code by the at least one server, store it only for the duration of the verification session, and send it to at least one user;
   Receiving the dynamic generation code from the at least one server by the at least one user;
   Entering the dynamic generation code and a personal secret into a client dynamic password generator by the at least one user for generating a first dynamic password;
   Sending the first dynamic password and an at least one user's account identity to the at least one server by the at least one user;
   Retrieving the dynamic generation code and the at least one user's personal secret by the at least one server for generating a second dynamic password using a server dynamic password generator;
   Matching up the second dynamic password with the first dynamic password by the at least one server, and determine if there is a match.

2. The method of claim 1, wherein the computer implemented method further comprising computing device implemented method, or mobile device implemented method, or device implemented method, or computing machinery implemented method.

3. The method of claim 1, further comprising display of the generated first dynamic password on a display of the client dynamic password generator.

4. The method of claim 1, further comprising the dynamic generation code is not stored in the client dynamic password generation device, it is generated anew each time for each dynamic password generation, and it can expire after it's generated.

5. The method of claim 1, further comprising the dynamic generation code can be generated by an independent server or servers, by a user or users, by a party or parties, and deliver to the at least one server, to the at least one user, or to the at least one server and the at least one user.

6. The method of claim 1, further comprising the dynamic generation code can be a code of any size with at least one letter, or, a random number of any size with at least one digit.

7. The method of claim 1, wherein entering the dynamic generation code and a personal secret into a client dynamic password generator by the at least one user for generating a first dynamic password further comprising selecting an account by the at least one user; the account was registered at the at least one server by the at least one user.

8. The method of claim 1, wherein the personal secret is the personal-identification-number (PIN) or password or secret code of the selected account.

9. The method of claim 1, wherein the at least one user's account identity is the user identification of the selected account, which can be a username, or a userID, or a user's email address, or other user's identification.

10. The method of claim 1, wherein receiving the dynamic generation code by the at least one user further comprising receiving the dynamic generation code by a computer, or a computing device, or a mobile device, or other networked device that the at least one user use to connect and communicate with the server.

11. The method of claim 1, wherein the dynamic password generator is a computer, a computer server, a computer server cluster, a computing device, a mobile device, or other online or offline computing device that equipped with dynamic password generation software or hardware which is capable of generating a dynamic password based on a given set of input parameters.

12. The method of claim 11, wherein the input parameters include, but not limited to, a dynamic generation code or codes, a PIN or PINs, a password or passwords, a stored static secret or stored static secrets, a salt or salts, an account number or account numbers, a data item or data items.

13. The method of claim 12, wherein the salt is an algorithmic salt that can be computed according to pre-selected algorithm or algorithms, which are shared between the client dynamic password generator and the server dynamic password generator.

14. The method of claim 12, wherein the salt can be pre-computed and stored.

15. The method of claim 12, wherein one or more stored static secrets can be uniquely linked to an account that is registered at the at least one server by the at least one user.

16. The method of claim 12, wherein one or more stored static secrets can be uniquely linked to the client dynamic password generator used by the at least one user.

17. The method of claim 11, wherein generating a dynamic password based on a given set of input parameters further comprising algorithmically combining the input parameters that are selected from the group consisting of dynamic generation code or codes, PIN or password or PINs or passwords, stored static secret or stored static secrets, salt or salts, account number or numbers, amount or amounts, data item or data items, document or documents or document links, and combinations thereof.

18. A computer implemented method for generation and verification of a dynamic password, also known as one-time-password token, providing at least one server, comprising:
   Generating a dynamic generation code or codes by the at least one server, store them only for the duration of the verification session, and send them to at least one user;
   Receiving the dynamic generation code or codes from the at least one server by the at least one user;
   Entering the dynamic generation code or codes and a personal secret or secrets into a client dynamic password generator by the at least one user for generating a first dynamic password;
   Sending the first dynamic password and an at least one user's account identity to the at least one server by the at least one user;
   Retrieving the dynamic generation code or codes and the at least one user's personal secret or secrets by the at least one server for generating a second dynamic password using a server dynamic password generator;
   Matching up the second dynamic password with the first dynamic password by the at least one server, and determine if there is a match.

19. A computer implemented method for generation and verification of a dynamic password, also known as one-time-password token, providing at least one party, comprising:
   Generating a dynamic generation code or codes by the at least one party, store them only for the duration of the verification session, and send them to a second party;
   Receiving the dynamic generation code or codes from the at least one party by the second party;
   Entering the dynamic generation code or codes and a personal secret or secrets into a client dynamic password generator by the second party for generating a first dynamic password;

Sending the first dynamic password and a second party's account identity to the at least one party by the second party;

Retrieving the dynamic generation code or codes and the second party's personal secret or secrets by the at least one party for generating a second dynamic password using a server dynamic password generator;

Matching up the second dynamic password with the first dynamic password by the at least one party, and determine if there is a match.

* * * * *